United States Patent [19]
Eriksson

[11] Patent Number: 5,454,674
[45] Date of Patent: Oct. 3, 1995

[54] LOCK NUT HAVING LOCKING SCREW

[75] Inventor: Arne Eriksson, Västerås, Sweden

[73] Assignee: SKF Mekan AB, Katineholm, Sweden

[21] Appl. No.: 211,495

[22] PCT Filed: Mar. 15, 1994

[86] PCT No.: PCT/SE94/00216

§ 371 Date: Aug. 18, 1994

§ 102(e) Date: Aug. 18, 1994

[87] PCT Pub. No.: WO94/21930

PCT Pub. Date: Sep. 29, 1994

[30] Foreign Application Priority Data

Mar. 19, 1993 [SE] Sweden ................................. 9300903

[51] Int. Cl.$^6$ ............................ F16B 37/08; F16B 39/04
[52] U.S. Cl. .................... 411/295; 411/305; 411/433; 411/937.2
[58] Field of Search ....................... 411/295, 296, 411/305, 306, 433, 937.2, 940

[56] References Cited

U.S. PATENT DOCUMENTS

| | | |
|---|---|---|
| 1,183,190 | 5/1916 | Hansell ................... 411/937.2 |
| 2,520,122 | 8/1950 | Brutus . |
| 4,086,946 | 5/1978 | Keen . |
| 4,227,560 | 10/1980 | Karlsson . |
| 4,436,468 | 3/1984 | Ozaki et al. ................. 411/295 X |
| 4,645,395 | 2/1987 | Lundgren ................... 411/295 |

FOREIGN PATENT DOCUMENTS

| | | | |
|---|---|---|---|
| 448817 | 6/1948 | Canada ................... 411/295 |
| 2177178 | 1/1987 | United Kingdom . |

*Primary Examiner*—Neill R. Wilson
*Attorney, Agent, or Firm*—Burns, Doane, Swecker & Mathis

[57] ABSTRACT

A lock nut includes a nut body (10) having outer (12) and inner (14) circumferential surfaces. The inner surface (14) defines a screw-threaded axial through-hole that can be mounted on an externally threaded shaft. A plurality of blind bores (18) is formed in the nut body (10), each blind bore extending radially inwardly from the outer surface. Those blind bores (18) terminate short of the inner surface so that a plastically displaceable part (20) of the nut body remains between each blind bore and the inner surface to close-off a radial inner end of the blind bore (18). Locking screws (30) are mounted in respective blind bores (18). By tightening the locking screws (30), the displaceable portions (20) are pressed against the externally threaded shaft to frictionally grip the shaft.

10 Claims, 2 Drawing Sheets

LOCK NUT HAVING LOCKING SCREW

BACKGROUND TO THE INVENTION

1. Technical Field

The present invention refers to an internally threaded, lockable precision nut.

2. State of the Art

It has been previously known to lock nuts on threaded shafts by means of lock screws, and it is also known to arrange lock screws in the nut itself. One example is shown in U.S. Pat. No. 2,520,122, according to which a hole is bored in the wall of the nut from the inside of the nut. Another variant is shown in U.S. Pat. No. 4,227,560, in which the lock nut is provided with a thread bored at an acute angle and intersecting the threaded axial through-hole of the nut. Into this hole a lock screw is inserted and a lock plug is situated at the inner end of the screw, acting against the outer thread of the shaft, which plug is displaced by the lock screw to a locking position. A drawback of this construction is that the locking force acts against only one thread flank with high surface pressure, whereby there is a risk of a permanent impression being produced in the thread. Also, the axial pressure component presses the nut axially as far as the thread play permits, and the result will be unwanted axial throw, which is difficult to balance with remaining locking screws. The accessibility will be inferior due to the acute angle of the lock aperture, etc.

A similar construction, but with axial holes for a lock screw and a lock plug, is also known, but a common drawback of similar designs is that they become expensive.

A common drawback of these and other known designs with plug lock is that the construction does not give efficient clamping, which prevents bearing play, in particular efficient clamping is not achieved after repeated use of the nut.

It has also been proposed (see U.S. Pat. No. 4,086,946 and GB 2 177 178A) to form one or more axial recesses in the nut at a location spaced radially outwardly of the centre hole. A portion of the nut disposed between the recess and the centre hole is resiliently displaceable by applying a radially inward force thereto. Such a force is applied by means of radial lock screws which are threadedly mounted in radial holes formed in the nut. When the resiliently displaceable portion is displaced inwardly, it firmly grips the externally threaded shaft on which the nut is mounted. Such a structure distributes the locking forces more uniformly to prevent the formation of permanent depressions in the externally threaded shaft, and also applies generally axially balanced forces from the nut to the externally threaded shaft. However, shortcomings of such a structure are that the presence of the axial recess decreases the strength and durability of the nut, and that a nut possessing such a recess is relatively difficult and expensive to produce. Also, if a locking fluid (such as an adhesive) were to be introduced into the hole in which the locking screw is disposed, in order to resist unlocking the screw by vibrations, etc., such fluid could flow through the recess and into the thread interface between the nut and the externally threaded member, thereby fouling that thread interface.

Accordingly, it would be desirable to provide a strong, durable lock nut of the type employing a locking screw, which can be easily and inexpensively manufactured and which can receive a locking fluid without fouling the thread interface between the nut and the externally threaded member. Also, there should be provided an emergency locking of the lock nut in case the locking screws, intentionally or unintentionally, are removed. Further, such a lock nut should not result in any permanent impression being formed in the externally threaded member, and it should be possible to axially balance the locking force applied to the nut.

SUMMARY OF THE INVENTION

The present invention relates to a lock nut which is adapted to be lockingly secured to an externally threaded member. The lock nut comprises a nut body and a locking screw. The nut body has radially inner and outer circumferential surfaces. The inner surface defines a screw-threaded axial through-hole adapted to be mounted on an externally threaded member. At least one blind bore extends into the nut body from the outer surface thereof in a lateral direction with respect to the axis of the through-hole. The blind bore terminates short of the inner surface so that a plastically and possibly somewhat resiliently displaceable portion of the nut body remains between the blind bore and a screw-threaded section of the inner surface. The displaceable portion includes a pressure face coinciding with an end surface of the blind bore to close-off a laterally inner end of the blind bore. At least a portion of a side surface of the blind bore is screw threaded. The locking screw is threadedly disposed in the blind bore and includes an inner end face arranged to bear against the pressure face to press the displaceable portion inwardly against the externally threaded member on which the nut body is mounted.

Preferably, the distance from the pressure face to a root of a screw thread of the through-threaded inner surface is from 5 to 20%, most preferably about 10%, of a maximum outer diameter of the screw thread of the locking screw.

There is preferably a plurality of blind bores formed in the nut body, with locking screws threadedly mounted in respective ones of those blind bores. More preferably, there are four blind bores spaced circumferentially apart by 90°. Each blind bore is preferably radially oriented.

The advantages of this nut are many:

If the lock nut according to the invention is to be exposed to vibrations which might be able to loosen the locking screws, the locking screws can be secured with locking fluid without any risk of the locking fluid flowing to the thread interface between the nut and the externally threaded member and causing obstruction when dismounting the nut. That is, the fact that the bores which receive the locking screws are blind bores, they will retain the locking fluid.

The manufacture of the nut body becomes simple and can be done inexpensively in one operation, for example in a multiple operation lathe. Then, only a mounting of the locking screws is required, preferably after a surface treatment is performed.

The construction avoids galvanism.

There is no separate shaft-engaging plug that can drop out from an unmounted nut. The earlier mentioned risk of a permanent impression being produced in the thread of the externally threaded shaft is avoided.

Clamping may be carried out, even with only one lock screw, and the axial thread play is small and balanced.

The radial tightening will remain even if the force from the lock screw ceases, and this provides an emergency locking if the lock screw should drop out.

BRIEF DESCRIPTION OF THE DRAWINGS

The objects and advantages of the invention will become apparent from the following detailed description of a preferred embodiment thereof in connection with the accompanying drawings in which like numerals designate like elements and in which.

DETAILED DESCRIPTION OF A PREFERRED EMBODIMENT OF THE INVENTION

Figure 1:
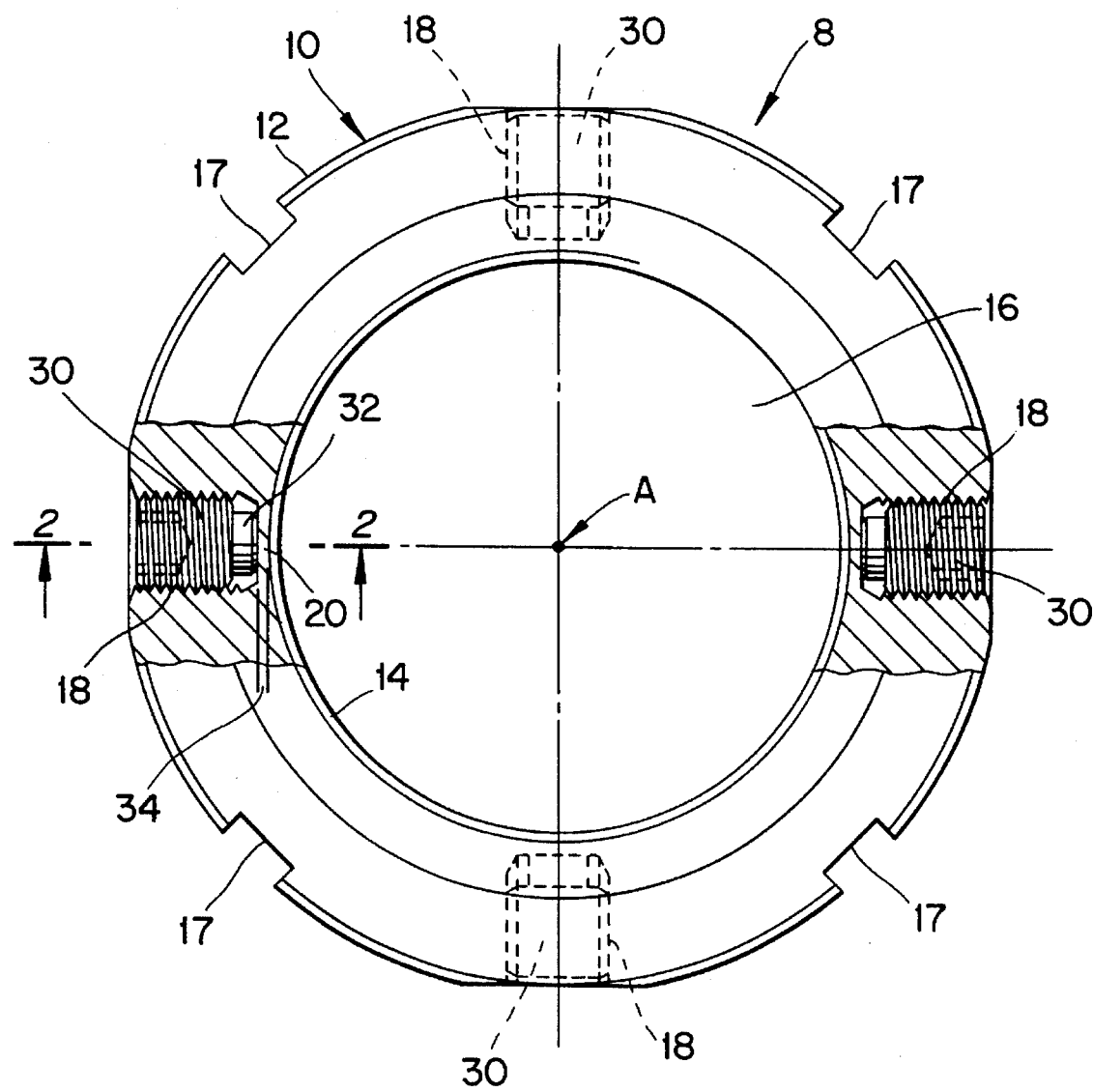
FIG. 1 is an end view of a lock nut according to the present invention, with a portion thereof being broken away to provide an axial section through a locking screw of the lock nut.

FIG. 1 shows a lock nut 8 which is to be mounted on an externally threaded shaft (not shown). The lock nut includes a nut body 10 having outer and inner circumferential surfaces 12, 14. The inner surface defines a screw-threaded axial through-hole 16 adapted to be mounted on the externally threaded shaft. The outer surface 12 has recesses 17 formed therein which can be gripped by a turning tool (not shown). At least one blind bore 18 is formed in the nut body 10 so as to extend from the outer surface 12 in a lateral (preferably radial) direction with respect to the axis A of the through-hole 16. Preferably, more than one blind bore 18 is provided. While four blind bores 18 are shown, any number can be provided. In the case of four blind bores, the bores are spaced circumferentially apart by 90 degrees as shown. In the case of two blind bores, the bores would be positioned in diametrically opposed relationship.

The bores are "blind" in that they terminate short of the inner surface 14 and are closed at their inner ends. A portion 20 of the nut body remains between the bore 18 and the inner surface 14 to close off the inner end of the bore 18.

Threadedly mounted within each blind bore is a locking screw 30. That screw 30 includes an inner end portion 32 in the shape of a cylindrical plug, an inner end face of which bears frictionally against the end surface of the blind bore 18.

Figure 2:
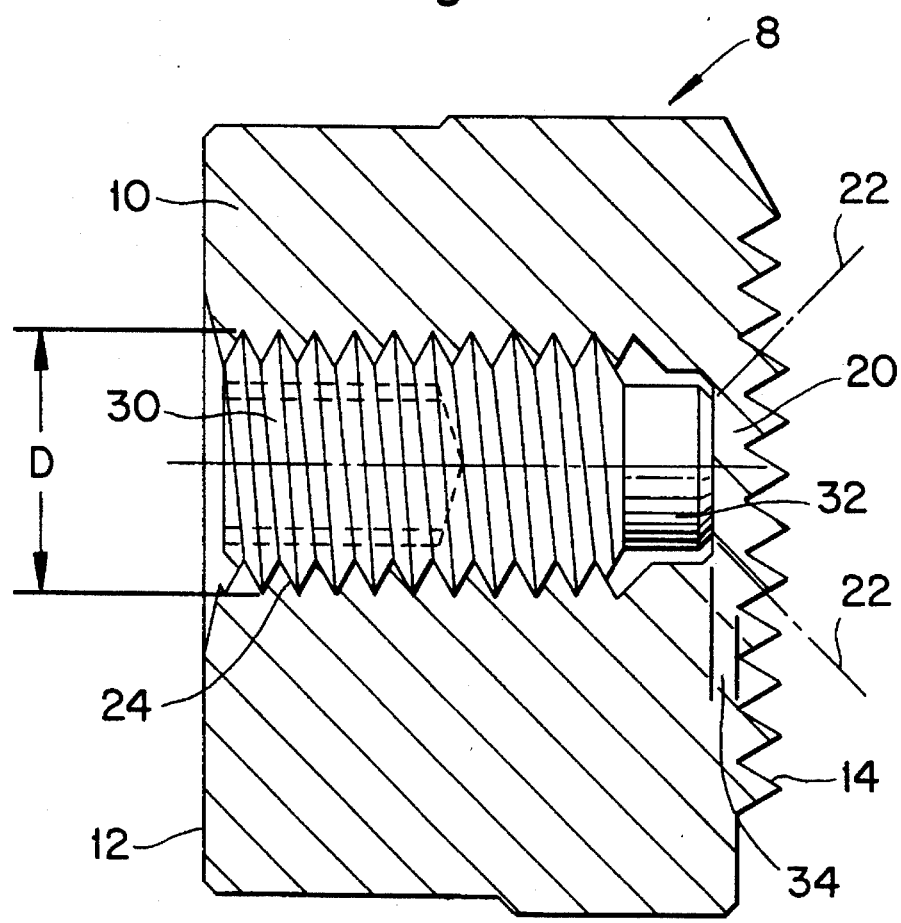
FIG. 2 is a sectional view taken along the line 2—2 in FIG. 1.
Figure 3:
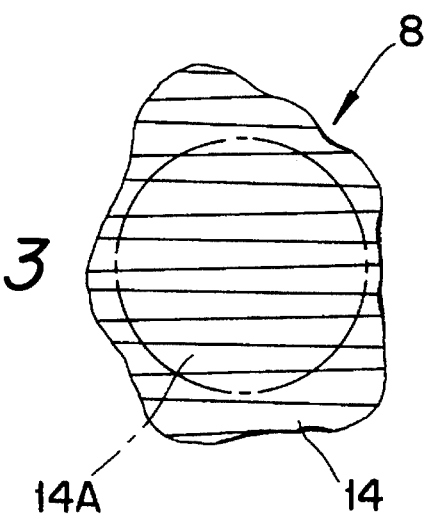
FIG. 3 is a view of a section of an internally threaded surface of the nut.

The portion 20 is forced against the threaded shaft by means of the screw portion 32. Upon tightening of the locking screw 30 a plastic (permanent) deformation arises along the lines 22 in FIG. 2. The lines 22 are the opposite generatrices of a general conical surface. As a result of this plastic deformation the generally conical bottom portion 20 is forced against the thread of the shaft for frictionally clamping the nut body 10 thereto. The generally circular locking surface portion 14A of the inner surface 14 is larger than the circular surface of the screw portion 32.

The portion 20 preferably has a thickness 34, i.e. a radial dimension between the inner end face of the plug 32 and the root of the screw thread of the inner surface 14, which is from 5 to 20 percent (most preferably 10 percent) of the maximum outer diameter D of the screw thread of the locking screw 30. This provides a suitable plastic deformability along the conical surface represented by the lines 22.

Due to the fact that the nut portion 20 is forced against the shaft threads upon a plastic deformation process an emergency locking is provided in case the lock screw drops out. For the same reason the locking function remains also if the lock screw intentionally is loosened in order to make possible removal of the lock nut. To remove the lock nut, therefore, it is necessary to apply impacts against the outer side of the lock nut, which impacts will cause the nut portion 20 to return to a non-locking position due to a plastic deformation in the reverse direction.

It will be appreciated that the lock nut according to the present invention can be formed easily and economically, since there is no need to form axial recesses in the nut body. Also, any weakness in the nut body which would have resulted from the presence of such axial recesses is avoided. In the event that it is desired to lock the locking screw 30 within its blind bore 18 by means of a locking liquid (adhesive) to prevent the locking screw from being loosened by vibrations, etc., that can be accomplished without any risk that the liquid will flow to, and foul, the thread interface between the nut body and the externally threaded shaft. That is, since the bores 18 are blind, the locking liquid will be confined by the inner ends of those bores.

Furthermore, the present invention will not result in the permanent deformation of the externally threaded shaft, since the lateral locking forces will be effectively distributed along an axial region. For the same reason, the locking forces applied from the lock nut to the shaft will be axially balanced.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

I claim:

1. A lock nut adapted to be lockingly secured to an externally threaded member, said locking nut comprising a nut body having radially inner and outer circumferential surfaces, said inner surface defining a screw-threaded axial through-hole adapted to be mounted on an externally threaded member, there being provided at least one threaded blind bore extending into said nut body from said outer surface in a lateral direction with respect to the axis of said through-hole, said blind bore terminating short of said inner surface so that a displaceable portion of said nut body remains between said blind bore and a screw-threaded section of said inner surface, and a locking screw threadedly disposed in said blind bore and including an inner end face arranged to bear against said displaceable portion inwardly against an externally threaded member on which said nut body is mounted substantially due to a plastic deformation of a nut body portion generally surrounding said displaceable portion.

2. A locking nut according to claim 1, wherein the locking screw is provided with a cylindrical bar portion at its radially innermost end, said bar portion being adapted to abut against said pressure face.

3. A lock nut according to claim 2, wherein a distance from said pressure face to a root of a screw thread of said screw-threaded inner surface is from 5 to 20 percent of a maximum diameter of a screw thread of said locking screw.

4. A lock nut according to claim 3, wherein said radial distance is about 10 percent of said maximum diameter.

5. A lock nut according to claim 1, wherein said pressure face is circular and has a diameter generally corresponding to a minimum thread diameter of the screw thread of said blind bore.

6. A lock nut according to claim 1, wherein there is a plurality of said blind bores and locking screws threadedly mounted in respective ones of said blind bores.

7. A lock nut according to claim 6, wherein there are four blind bores spaced circumferentially apart by 90 degrees.

8. A lock nut according to claim 1, wherein said blind bore is radially oriented.

9. A lock nut according to claim 1, wherein a distance from said pressure face to a root of a screw thread of said screw-threaded inner surface is from 5 to 20 percent of a maximum diameter of a screw thread of said locking screw.

10. A lock nut according to claim 1, wherein said displaceable portion is plastically displaceable.

\* \* \* \* \*